United States Patent

Aoyama et al.

Patent Number: 4,473,046
Date of Patent: Sep. 25, 1984

[54] DIRECT INJECTION TYPE INTERNAL COMBUSTION ENGINE

[75] Inventors: Taro Aoyama; Yujiro Oshima; Junichi Mizuta; Kiyokazu Sunami, all of Aichi, Japan

[73] Assignee: Kabushiki Kaisha Toyota Chuo Kenkyusho, Aichi, Japan

[21] Appl. No.: 513,490

[22] Filed: Jul. 13, 1983

[30] Foreign Application Priority Data

Jul. 13, 1982 [JP] Japan .................. 57-121413

[51] Int. Cl.³ .............................................. F02F 3/26
[52] U.S. Cl. .................................. 123/279; 123/285; 123/276; 123/294
[58] Field of Search ............... 123/275, 276, 279, 294, 123/285, 657, 661, 664

[56] References Cited

U.S. PATENT DOCUMENTS

| | | | |
|---|---|---|---|
| 4,164,913 | 8/1979 | Komiyama et al. | 123/276 |
| 4,221,190 | 9/1980 | Komiyama et al. | 123/285 |
| 4,294,206 | 10/1981 | Urlaub et al. | 123/276 |
| 4,311,122 | 1/1982 | Banba et al. | 123/279 |

FOREIGN PATENT DOCUMENTS

| | | | |
|---|---|---|---|
| 1178637 | 9/1964 | Fed. Rep. of Germany | 123/294 |
| 0032213 | 3/1978 | Japan | 123/285 |
| 0181926 | 11/1982 | Japan | 123/294 |
| 0816785 | 7/1959 | United Kingdom | 123/294 |

*Primary Examiner*—Parshotam S. Lall
*Attorney, Agent, or Firm*—Sughrue, Mion, Zinn, Macpeak and Seas

[57] ABSTRACT

A direct injection type internal combustion engine includes a centrifugal injector having its port facing a recess formed in a combustion chamber. The injector is arranged such that its axis of injection fails to intersect the central axis of the recess but extends at an inclination with respect to the same. In an embodiment typifying the invention, the following relationship is satisfied:

$$H \frac{\tan\left(\frac{\theta_s}{2}\right)}{\sin \theta} \leq \frac{1}{2} D - \beta$$

in which: D designates the maximum distance between facing sides of said recess; wherein with respect to a first transverse plane containing the location of the maximum distance D of said recess and a second plane intersecting said first transverse plane at a right angle, being parallel to the axis of sprays of the swirl injector and containing the center of the recess on the first transverse plane, $\beta$ designates the distance between the axis of sprays of said swirl injector and a second plane intersecting, at a right angle, a first transverse plane containing the location of the maximum distance D of said recess, said second plane being parallel to the axis of sprays of said swirl injector and containing the center of said recess on said first transverse plane; $\theta$ designates the angle contained between the axis of sprays of said swirl injector and the first transverse plane; and $\theta_s$ designates the angle of sprays of said swirl injector during fuel injection. The practice of the invention prevents the wall surface of the combustion chamber from being wetted with fuel, thereby improving the combustion phenomena and reducing the specific consumption.

4 Claims, 15 Drawing Figures

DIRECT INJECTION TYPE INTERNAL COMBUSTION ENGINE

BACKGROUND OF THE INVENTION

The present invention relates to an internal combustion engine directly injecting fuel into a combustion chamber thereof.

In the prior art, a direct injection type internal combustion engine having the piston top faces formed with a recess to define the combustion chamber was frequently used for large-sized engine applications because it had advantages over internal combustion engines having a swirl chamber or a precombustion chamber, in that it had less friction loss and lowered fuel consumption. These advantages stem from the fact that there is no communication hole between the swirl or precombustion chamber and the combustion chamber, and that the compression ratio is reduced to a relatively small value.

However, a small-sized engine having a small cylinder bore diameter encounters more problems than the large-sized engine.

In the direct injection type internal combustion engine of the prior art, more specifically, a fuel injector is arranged substantially at the center of the recess, which is formed in the piston top face, so that a plurality of fuel jects may be radially injected from a plurality of injection ports. The intake swirls established by an intake valve or in an intake passage in the suction stroke of the engine still exist even at the end of the compression stroke, so that an air-fuel mixture is prepared in the recess while the atomized fuel droplets are entrained in the swirling direction of the vortexes. The recess used customarily has a diameter ranging from 40% to 70% to that of the piston or the cylinder. In a small-sized engine having pistons of a diameter smaller than 100 mm, therefore, the recess diameter is accordingly small and is reduced all the more since it is intended to increase the compression ratio. As a result, the fuel jets, which are radially injected from the plural injection ports of the fuel injector, impinge upon the inner wall surface of the recess so that they wet the wall surface in the form of a fuel film, or remain in the form of coarse droplets, which fail to be effectively burned. As a result, the volume of mixture effective for combustion is reduced, to raise problems such as a reduction in the output power, an increase in the fuel consumption rate and/or the emission of smoke.

In order to prevent the fuel droplets from impinging upon the wall surface of the recess, there have been generally adopted a method (a) by which the swirling flow to be established in the combustion chamber is intesified; a method (b) by which the fuel injector has its injection portions reduced in size but increased in number; and a method (c) by which the compression ratio is increased to raise the pressure (or density) in the recess of the time of fuel spray to thereby reduce the penetration of the fuel injector.

In method (a), an engine having a cylinder bore diameter of 100 to 120 mm has its swirl ratio (which is a measure of the intensity of the swirl to be established in the combustion chamber and is the ratio of the swirling angular velocity to the engine r.p.m.) limited to about 4, whereas an engine having a cylinder bore diameter smaller than 90 mm has its swirl ratio limited to 3.5 to 3.6. If the swirl ratio exceeds the above-specified values, the intake passage has its flow resistance increased to invite problems such that the charging efficiency of the intake air by the engine is remarkably degraded and that the heat loss to the wall surface of the combustion chamber is augmented.

In method (b), the fuel is atomized to weaken its penetration if the effective areas of the injection ports of the fuel injector are reduced. With excessively small sizes, however, the injection ports are liable to become clogged, so that there arise practical problems for injection ports having a diameter smaller than 0.15 mm. If the number of the injection ports is excessively enlarged, on the other hand, the fuel droplets injected from adjoining injection ports collide with one another in the vicinity of the side wall of the recess so that an overrich region of fuel is locally established to raise problems causing engine smoking. An engine having a cylinder bore diameter smaller than 120 mm is usually equipped with four or five injection ports.

In method (c), since the compression ratio is determined by the ratio between the stroke volume and the clearance volume at top dead center, the volume of the recess has to be more than 70% of the clearance volume so that the direct injection type internal combustion engine may generate sufficient output power. In order to raise the compression ratio, therefore, it is desired that the clearance, having no contribution to combustion, formed between the cylinder head and the piston top face is minimized. However, the aforementioned clearance is limited to about 0.5 mm if the thermal expansion of the engine parts caused by combustion, production errors and so on are taken into consideration. As a result, it becomes more difficult to increase the compression ratio for a smaller engine. If the compression ratio could be raised, there then arises a problem such that the engine becomes difficult to assemble and adjust.

SUMMARY OF THE INVENTION

In order to solve the aforementioned problems encountered by the small-sized direct injection type internal combustion engine of the prior art, the inventors have succeeded in achieving the present invention after repeated systematic experiments, analysis and trials.

From the aforementioned experiments and analyses, we have acquired the following findings.

Particularly, the conditions of the direct injection type internal combustion engine have to satisfy the following four items:

(1) Atomization.

Gasification and combustion are accelerated more with smaller sizes of fuel droplets. Hence, the fuel droplet to be injected from the fuel injector is required to have a smaller size.

(2) Penetration

If the fuel droplet is stagnant in the combustion chamber, it is confined by the burned gases so that the combustion does not proceed further. Hence, the fuel droplet is required to have a kinetic force sufficient to penetrate into the combustion chamber until combustion ends.

(3) Fuel Distribution

In order that as much fuel as possible may be burned in the combustion chamber without smoking to generate a high mean effective pressure the air in the cylinder has to be totally consumed during combustion. More specifically, that at a location where the fuel droplet fails to reach is not consumed in the least, whereas the air becomes short where the fuel droplets are densely gathered, inviting incomplete combustion. Hence, the fuel droplet is required to be dispersed to the corners of the combustion chamber and to be uniformly distributed as a whole.

(4) Burning Rate

The fuel droplet injected from the fuel injector diverges in the form of jets within the combustion chamber. This divergence is determined by the penetration and the distribution. If combustion is determined by such diffusion, however, much time is required to thereby make it difficult to complete combustion in an effective combustion period. Hence, a vortex has to be established in the intake air to thereby accelerate the burning rate.

Conditions (1) to (3) described above pertain to the fuel injection. Specifically, the fuel droplet plays an important role in the dispersion (i.e., the preparation of the mixture) of itself by fuel injection. In other words, the atomized fuel droplets prepare the mixture while suitably dispersing and penetrating at a sufficient velocity within the combustion chamber. In the direct injection type internal combustion engine of the prior art, therefore, it is widely accepted as common sense that an injection nossle having weak penetration cannot be employed.

Our experimental analyses have revealed that in existing theory, the penetration and the fuel droplet size and spray angle cannot be compatibly improved:
a. The penetration is weakened if the size of the fuel droplet is reduced; and
b. The penetration is also weakened if the angle of spray is increased so as to improve the distribution of the fuel within the combustion chamber.

Therefore, in order that the fuel droplets may be small-size and evenly distributed without cutting their arrival ranges, both an intense intake swirl flow and a high compression ratio (or density) have been required.

With these requirements in mind, the present invention charges the common sense approach, such that the fuel injector of the present invention functions both to finely atomize the fuel and to distribute the fuel widely on the projected plane in the combustion chamber but is not expected to function to effect penetration. Therefore, the fuel droplets injected from the fuel injector may be stagnant at their respective positions unless there is a flow of the intake air within the combustion chamber. The intake swirl, which is established in the combustion chamber in a descending manner while swirling, and/or the flow, which enters the recess from the flat portion of the piston top face, carry the fuel droplet in the depth direction of the combustion chamber while ensuring the burning rate. In other works, the fuel injector is made to take charge of the distribution of the fuel droplets into a specified region of the recess whereas the intake swirl and/or the so-called "squish flow" are made to take charge of the dispersion of the fuel droplets over the whole of the recess.

In view of the description thus far presented, therefore, an object of the present invention is to provide a direct injection type internal combustion engine which is enabled to improve the dispersion of fuel droplet within the combustion chamber and to prevent the same from wetting the wall surface of the same, while neither intensifying the intake swirl in the combustion chamber nor increasing the pressure of the fuel to be injected into the combustion chamber.

It is a more particular object of the present invention to provide a direct injection type internal combustion engine in which a centrifugal injector having its injection port facing a recess formed in the combustion chamber is arranged such that its axis of injection fails to intersect the central axis of the recess, but extends at an inclination relative to the same with predetermined numerical relationships therebetween, whereby it is intended to prevent the wall surface of the combustion chamber from being wetted with fuel to thereby improve the combustion phenomena and to reduce the specific fuel consumption.

More specifically, an object of the present invention is to provide a direct injection type internal combustion engine suitable for mixing an atomized fuel with intake air having weak turbulences by providing a swirl injector with the purpose of dispersing the atomized fuel in predetermined regions of the recess, whereby the atomization of the fuel is improved by a low injection pressure, and the dispersion of the atomized fuel in the predetermined recess region is also improved thanks to a large angle of spray and a weak penetration of the atomized fuel, to thereby prevent the wall surface of the combustion chamber from being wetted with the atomized fuel.

Another object of the present invention is to provide a direct injection type internal combustion engine in which the substantially uniform dispersion of the fuel throughout the recess is performed by the tubulent flow of intake air established in the combustion chamber and swirling downwardly and/or the so-called "squish flow" to thereby increase the mixing rate of the atomized fuel to the main flow of the turbulent intake air, and in which the atomized fuel itself is intensely propelled in the depth direction of the combustion chamber to thereby be prevented from wetting the wall surface of the combustion chamber and to promote the swirling of the turbulent intake air to thereby ensure a high burning rate.

Still another object of the present invention is to provide a direct injection type internal combustion engine in which the atomized fuel is not localized about the central axis of the recess but is mixed with the main flow of the turbulent intake air so that it is carried to the peripheral portions of the recess, and in which ignition is begun at the peripheal portions of the recess so that the burned gases are carried to the central portion of the recess by the turbulent flow of the intake air, whereby unburned gasses are made to reside at the peripheral portions of the recess at all times to thereby stabilize and smoothen the combustion process.

A further object of the present invention is to provide a direct injection type internal combustion engine in which droplets of the atomized fuel are prevented from impinging upon the wall surface of the combustion chamber and from becoming coarse, to thereby discharge remarkably little smoke, and in which the fuel is excellently atomized and dispersed to reduce the emission of hydrocarbons and to suppress the formation of fine particles of carbon and at the same time to shorten the ignition delay, to thereby markedly improve the combustion phenomena.

DETAILED DESCRIPTION OF THE PREFERRED EMBODIMENTS

In order to achieve the above-specified objects, the inventors have first provided a centrifugal injector for atomizing the fuel, generally in the form of jets, with a low injecting pressure, while swirling the same. This swirl injector is advantageous—(a) in that it has such a low injection pressure that it requires no high-pressure injection mechanism; (b) in that it can conveniently improve the dispersion of atomized fuel because it has an excellent atomization of the fuel and a large angle of fuel spray; (c) in that it can conveniently prevent the fuel droplet from wetting the wall surface because the penetration of fuel droplets is weak; and (d) in that it can suitably mix the fuel droplets with even a weak intake swirl, because the atomization is excellent but the penetration is weak, so that an intense intake swirl is not required.

In order to sufficiently make use of the aforementioned advantages of the swirl injector, the inventors have first investigated the mounting position of the swirl injector. When the swirl injector is positioned such that its axis of injection does not intersect but is inclined with respect to the central axis of the recess formed in the combustion chamber, the possibility of the fuel droplet wetting the open edge or side wall of the recess is increased, and the rate at which the fuel droplets are mixed with the main flow of the intake swirl within the recess is made lower, as the swirl injector is positioned further apart from the central axis of the recess and the closer to the open edge or side wall of the recess. As the swirl injector is positioned closer to the central axis of the recess, on the contrary, the fuel droplets are mixed at a lower rate with the main flow of the intake swirl within the recess. The inventors, therefore, have found that the possibility of the fuel droplet wetting the open edge or side wall of the recess is decreased and that the rate at which the fuel droplet are mixed with the main flow of the intake swirl within the recess is increased, if the following relationship is satisfied:

$$1/6 < x/D < 5/8$$

wherein: the maximum distance between the facing sides of the recess is designated by D (typically the largest diameter of the recess), and in a transverse plane containing the maximum distance D of the recess, the distance between the axis of injection of the swirl injector during fuel injection and the central axis of the recess is designated by x.

According to the present invention, more specifically, there is provided a direct injection type internal combustion engine including a combustion chamber formed with a recess therein, in which intake air is introduced and swirled; and a fuel injector disposed so as to face the opening of the recess, wherein the improvement resides in that the fuel injector is a swirl injector for atomizing fuel in generally a conical form while swirling the same; in that the swirl injector is arranged such that its axis of sprays fails to intersect the central axis of the recess but extends at an inclination with respect to the same; and in that the following relationship is satisfied:

$$1/6 < x/D < 5/8$$

wherein: the maximum distance between the facing sides of the recess is designated by D; and in a transverse plane containing the maximum distance D of the recess, the distance between the axis of sprays of said swirl injector during fuel injection and the central axis of the recess is designated by x'.

As is apparent from the foregoing description of the procedure according to this embodiment of the invention, the direct injection type internal combustion engine is enabled to improve the dispersion of the fuel droplet within the recess and to prevent the fuel droplet from wetting the open edge or side wall of the recess, while neither intensifying the intake swirl within the recess of the combustion chamber nor increasing the pressure of the fuel to be injected into the recess. Thus, it is possible to eliminate the drawbacks of the prior art, which are due to the facts that the intake swirl was intensified and the fuel injection pressure was increased.

According to the present invention, moreover, it has been found that the possibility of the fuel droplet wetting the open edge or side wall of the recess is reduced, and that rate at which the fuel vapors are mixed with the main flow of the intake vortex within the recess can be augmented, if the following relationship is satisfied:

$$H \frac{\tan\left(\frac{\theta_s}{2}\right)}{\sin \theta} \leq \frac{5}{8} D - \beta$$

and if the following relationship is satisfied:

$$H \frac{\tan\left(\frac{\theta_s}{2}\right)}{\sin \theta} < \frac{D}{8} + \beta$$

in which: D designates the miximum distance between facing sides of said recess; wherein with respect to a first transverse plane containing the location of the maximum distance D of said recess and a second plane intersecting said first transverse plane at a right angle, being parallel to the axis of sprays of the swirl injector containing the center of the recess on the first transverse plane, $\beta$ designates the distance between the axis of sprays of said swirl injector and a second plane intersecting, at a right angle, a first transverse plane containing the location of the maximum distance D of said recess, said second plane being parallel to the axis of sprays of said swirl injector and containing the center of said recess on said first transverse plane; $\theta$ designates the angle contained between the axis of sprays of said swirl injector and the first transverse plane; and $\theta_s$ designates the angle of sprays of said swirl injector during fuel injection.

According to the present invention, more specifically, there is provided a direct injection type internal combustion engine including a combustion chamber formed with a recess therein, in which intake air is introduced and swirled; and a fuel injector disposed to face the opening of the recess. Wherein the improvement resides in that the fuel injector is a swirl injector for atomizing fuel in generally a conical shape while swirling the same; in that the swirl injector is arranged such that its axis of injection fails to intersect the central axis of the recess but extends at an inclination with respect to the same; and in that the following relationship is satisfied:

$$H \frac{\tan\left(\frac{\theta_s}{2}\right)}{\sin \theta} \leq \tfrac{3}{8} D - \beta$$

wherein: D designates the maximum distance between facing sides of said recess; wherein with respect to a first transverse plane containing the location of the maximum distance D of said recess and a second plane intersecting said first transverse plane at a right angle, being parallel to the axis of sprays of the swirl injector and containing the center of the recess on the first transverse plane, $\beta$ designated the distance between the axis of sprays of said swirl injector and a second plane intersecting, at a right angle, a first transverse plane containing the location of the maximum distance D of said recess, said second plane being parallel to the axis of sprays of said swirl injector and containing the center of said recess on said first transverse plane; $\theta$ designates the angle contained between the axis of sprays of said swirl injector and the first transverse plane; and $\theta_s$ designates the angle of sprays of said swirl injector during fuel injection.

According to the internal combustion engine of the second embodiment thus defined, by satisfying the above specified numerical relationship, it is made possible to feed the fuel droplet to a predetermined region of the recess, while preventing the same from wetting the open edge or side wall of the recess, to augment the rate at which the fuel droplets are mixed the main flow of the intake swirl within the recess, and to establish the so-called "squish flow," which is directed from a clearance formed between said cylinder head and the piston top face toward the center of the recess, so that the squish flow can partly prevent the fuel spray from wetting the aforementioned open edge or side wall of the recess, and partly promote the swirling flow of the aforementioned intake swirl.

According to the internal combustion engine of second embodiment therefore, the fuel droplet can be prevented from impinging upon the side wall of the recess by satisfying the above-specified numerical relationship, and the fuel in the recess can be distributed substantially uniformly over the entire region thereof, while being carried by the intake swirl, by either the single action of the intake swirl or its interaction with the squish flow. Therefore, the internal combustion engine of this embodiment can prevent the fuel droplet from impinging upon the wall surface of the recess and from becoming course, to thereby remarkably reduce smoking; and can, because of the excellent fuel atomization and dispersion of the swirl injector, reduce the emission of hydrocarbons (HC), suppress the formation of fine carbon particles, and shorten the ignition delay to thereby markedly improve the combustion phenomena and performance with resultant outstanding practical effects.

According to another aspect to the present invention, furthermore, there is provided a direct injection type internal combustion engine including a combustion chamber defined by a piston, a cylinder head and a cylinder block and formed with a recess therein, in which intake air is introduced and swirled; and a fuel injector disposed to face the opening of the recess, wherein the improvement resides in that the fuel injector is a swirl injector for atomizing fuel in generally a conical form while swirling the same; in that the swirl injector is arranged such that its axis of spray fails to intersect the central axis of the recess but extends at an inclination with respect to the same; and in that the following relationship is satisfied:

$$H \frac{\tan\left(\frac{\theta_s}{2}\right)}{\sin \theta} < \frac{D}{8} + \beta$$

in which: D designates the maximum distance between facing sides of said recess; wherein with respect to a first transverse plane containing the location of the maximum distance D of said recess and a second plane intersecting said first transverse plane at a right angle, being parallel to the axis of sprays of the swirl injector and containing the center of the recess on the first transverse plane, $\beta$ designates the distance between the axis of sprays of said swirl injector and a second plane intersecting, at a right angle, a first transverse plane containing the location of the maximum distance D of said recess, said second plane being parallel to the axis of sprays of said swirl injector and containing the center of said recess on said first transverse plane; $\theta$ designates the angle contained between the axis of sprays of said swirl injector and the first transverse plane; and $\theta_s$ designates the angle of sprays of said swirl injector during fuel injection.

This third embodiment thus far defined is enabled by satisfying the above-specified numerical relationship to enjoy operational effects substantially similar to those of the foregoing second embodiment and, in addition, the effects of further increasing the rate at which the fuel droplets under consideration are mixed with the main flow of the intake swirl within the recess, without gathering locally at the central axis of the recess, and stably and smoothly ensuring the continuous combustion phenomena. More specifically, the fuel droplets are mixed with the main flow by the action of the intake swirl so that they are confined locally in the peripheral portion of the recess. After this, ignition is effected from the peripheral portion of the recess so that the burned gases are carried by the intake swirl to the central portion of the recess. Therefore, the possibility of the continuous combustion phenomena being deteriorated can be obviated by the fact that the unburned gases are always stagnant in the peripheral portion of the recess.

According to a modification of the second embodiment, there is provided a direct injection type internal combustion engine, wherein the following relationships are satisfied:

$$\theta > \frac{\theta_s}{2} \text{; and } Z + \frac{H}{\tan \theta} \leq \frac{3}{4} D + \alpha$$

$$Z = \frac{H}{\sin \theta \cdot \cos \theta \left( \frac{\tan \theta}{\tan \left( \frac{\theta_s}{2} \right)} - 1 \right)}$$

in which: $\alpha$ designates the distance between the port of injection of said swirl injector during fuel injection and the plane intersecting the second plane at a right angle and containing the center of the recess on the first transverse plane.

According to a modification of the third embodiment, on the other hand, there is provided a direct injection type internal combustion engine, wherein the following relationships are satisfied:

$$\theta > \frac{\theta_s}{2} \text{; and } Z + \frac{H}{\tan \theta} \leq \frac{3}{4} D + \alpha,$$

$$Z = \frac{H}{\sin \theta \cdot \cos \theta \left( \frac{\tan \theta}{\tan \left( \frac{\theta_s}{2} \right)} - 1 \right)}$$

in which: $\alpha$ designates the distance between the port of injection of said swirl injector during fuel injection and the plane intersecting the second plane at a right angle and containing the center of the recess on the first transverse plane.

Incidentally, the above-defined equation for Z is expressed as above, considering both the condition under which the fuel droplet does not wet the wall surface of the recess above the plane containing the maximum diameter D of the recess, and the effects of the intake vortex or the squish flow. The equation for Z will be described in detail in the following with reference to FIG. 6.

As shown, the value Z designates the distance between a point N, at which a line perpendicular to a point L on an extension of the axis of sprays directed toward the side wall of the recess intersects a plane containing the aforementioned maximum diameter D of the recess at said side wall of the recess, and a point M at which said injection axis extension intersects the plane containing the maximum diameter D of the recess. Moreover, reference letter H appearing in FIG. 6 designates the length of a perpendicular extending from the port of injection to a plane containing the position of the maximum distance D of the recess.

Figures 6, 7, 8:
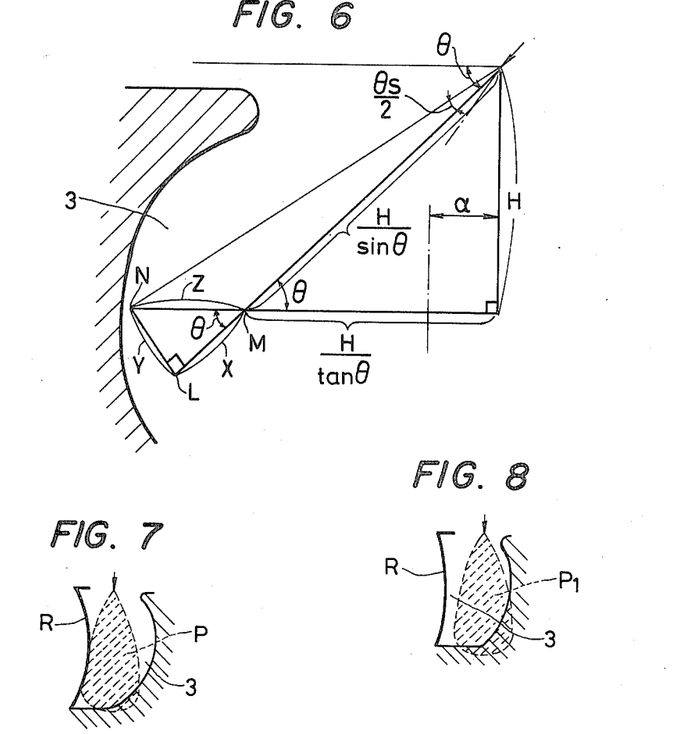
FIG. 6 is a diagram illustrating the relationship between the injector and the recess.
FIGS. 7 and 8 are schematic views showing the respective relationships between the wall surface of the recess and the fuel spray in the second embodiment of the invention.

On the other hand, letters X and Y designate the distance between the above-described points L and M, and the distance between the above-specified points L and N, respectively.

Furthermore, the following equations hold:

$$Y = \left( X + \frac{1}{\sin \theta} \right) \times \tan \left( \frac{\theta_s}{2} \right);$$

$$Z = \frac{X}{\cos \theta};$$

$$\frac{Z}{Y} = \frac{1}{\sin \theta}; \text{ and}$$

$$Z = \frac{X}{\cos \theta} = \frac{H}{\sin \theta \cdot \cos \theta \left( \frac{\tan \theta}{\tan \left( \frac{\theta_s}{2} \right)} - 1 \right)}$$

Hence, the internal combustion engine of the present invention is required to satisfy the following relationships:

$$Z + H/\tan \theta - \alpha \leq \tfrac{3}{4} D.$$

The direct injection type internal combustion engine according to the respective modifications of the foregoing second and third embodiments can sufficiently improve the combustion phenomena from the standpoint that the centrifugal injector has a variety of features such as improved atomization, a large angle of spray and the small penetration even under a low injection pressure.

The respective modifications, taking the aforementioned penetration of the fuel spray into consideration, can achieve a better improvement in the combustion phenomena. In the respective modifications of the second and third inventions, more specifically, the dispersion of the fuel droplet within the recess can be remarkably improved by considering the interference between the arrival range of the fuel droplet concerning the direction of injection and the side wall of the recess so that engine performance can be markedly improved.

As is apparent from the foregoing description of the procedure according to the invention, the direct injection type internal combustion engine of the invention can improve the dispersion of the fuel droplets within the recess and prevent the fuel droplets from wetting the open edge or side wall of the recess while neither intensifying the intake swirl within the recess of the combustion chamber nor increasing the pressure of the fuel to be injected into recess. Thus, it is possible to eliminate the drawbacks of the prior art, which are due, as mentioned above, to the facts that the intake swirl is intensified and the fuel injection pressure is increased therein.

In the present invention, the swirl injector is arranged such that its axis of sprays is coaxial with the axis of injector or the axis of sprays is parallel with the axis of injector or the axis of sprays extends at an inclination with respect to the axis of injector.

A specific example of the first embodiment of the invention will now be described.

Figure 1:
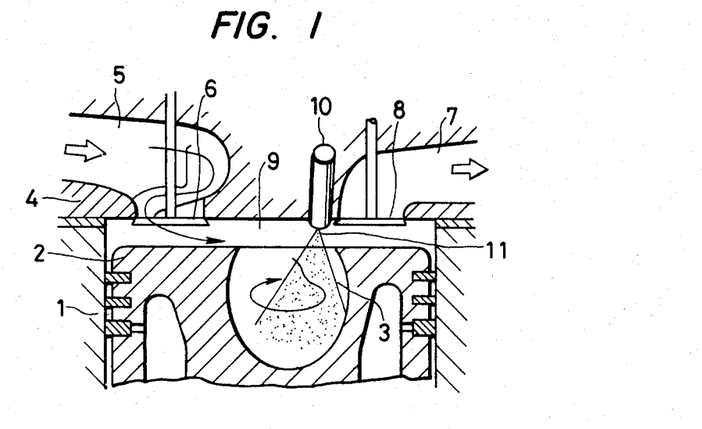
FIG. 1 is a longitudinal sectional view showing a direct injection type internal combustion engine according to one embodiment of the present invention.
Figure 2:
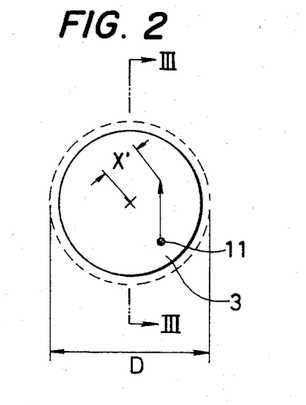
FIG. 2 is a top plan view showing the recess of the same internal combustion engine.
Figure 3:
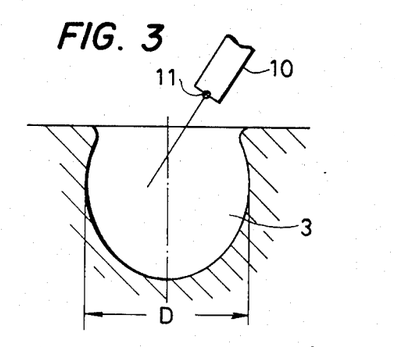
FIG. 3 is a section take alone line III—III of FIG. 2.

The direct injection type internal combustion engine of the present embodiment shown in FIGS. 1 to 3 is a Diesel engine. A piston 2 is slidably fitted in a cylinder 1 and has its top face formed with a generally spherical recess 3 which is eccentric with respect to the central axis thereof. On the open top end of the cylinder 1, there is overlaid a cylinder head 4 which is formed with an intake passage 5 and an exhaust passage 7. The intake passage 5 is equipped with an intake valve 6, and the exhaust passage 7 is equipped with an exhaust valve 8, and the intake port and the exhaust port are arranged confronting the top face of the piston 2. A combustion chamber 9 is defined by the cylinder 1, the piston 2 and the cylinder head 4. A swirl injector 10 for a low-pressure fuel injector is mounted in the cylinder head 4 such that its injection port 11 faces the opening of the recess 3 forming a part of the combustion chamber 9, and such that its axis of injection fails to intersect the central axis of the recess 3 but extends at an inclination with respect to the same. As a result, the intake air flowing into the combustion chamber 9 via the intake 5 and establishing a swirl further flows into the recess 3, and fuel is sprayed generally in a conical form, while being swirled, into the main flow of the intake swirl within the recess 3 from the swirl injector 10, which is positioned at an inclination with respect to the swirling direction of that main flow.

The combustion chamber 9 has a stroke volume of 460 cm$^3$ and a compression ratio of 18:1. The recess has a capacity of 22 cm$^3$, and the maximum distance of the facing side walls of the recess 3, i.e., the maximum diameter D of the recess 3, is 35 mm. In a transverse plane containing the maximum diameter D of the recess 3, the distance between the axis of injection of the centrifugal injector 10 during fuel injection and the central axis of the recess 3 is 9 mm. For D=35 mm and x=9 mm, therefore, the ratio x/D takes a value of about ¼, which satisfies the following relationships:

1/6<x/D<⅜

Incidentally, the fuel injection pressure does not exceed 150 to 200 kg/cm$^2$, which value is low for a direct injection type internal combustion engine.

In the Diesel engine according to this embodiment, the fuel is sprayed under a low injection pressure from the centrifugal injector 10 into the relatively weak intake swirl within the recess 3 so that the fuel droplets are excellently dispersed without wetting the open edge or side wall of the recess 3.

One example of the second embodiment of the invention will now be described with reference to FIGS. 4 and 5.

Figure 4:
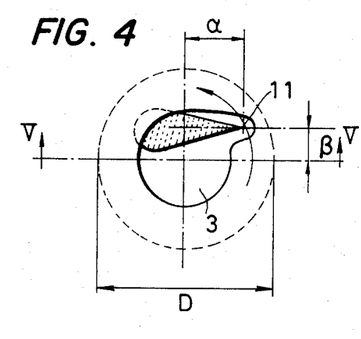
FIG. 4 is a top plan view showing the recess of the internal combustion engine according to a second embodiment of the present invention.
Figure 5:
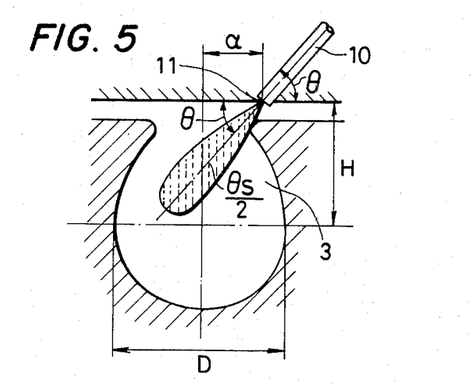
FIG. 5 is a section taken along line V—V of FIG. 4.

The direct injection type internal combustion engine of the present embodiment shown in FIGS. 4 and 5 is also a Diesel engine. A piston 2 is slidably fitted in a cylinder and has its top face formed with a generally spherical recess eccentric to the central axis thereof. On the open top end of the cylinder, there is overlaid a cylinder head 4 which is formed with an intake passage and an exhaust passage equipped with an intake valve and an exhaust valve and having their respective intake port and exhaust port arranged as described above. A combustion chamber is defined by the cylinder, the piston 2 and the cylinder head 4. A centrifugal injector 10 for a low-pressure fuel injector is mounted in the cylinder head 4 such that its injection port 11 faces the opening of the recess 3 forming a part of the combustion chamber and such that its axis of injection fails to intersect the central axis of the recess 3 but extends at an inclination with respect to the same. As a result, the intake air flowing into the combustion chamber via the intake passage and establishing a swirl further flows into the recess 3, and fuel is generally injected in conical form, while being swirled, into the main flow of the intake swirl within the recess from centrifugal injector 10, which is positioned at an inclination with respect to the swirling direction of that main flow.

The combustion chamber has a stroke volume of 460 cm$^3$ and a compression ratio of 18:1. The recess 3 has a capacity of 22 cm$^3$, and the maximum distance, i.e., the maximum diameter D between the facing side walls of the recess 3 is 38 mm. With respect to a first transverse plane containing the maximum diameter D of the recess 3 and a second transverse plane intersecting the first transverse plane at a right angle and containing the maximum diameter D of the recess 3, the minimum distance $\beta$ between the axis of atomization of the centrifugal injector 10 during fuel injection and the second transverse plane is 6 mm or 10 mm (the significance of the difference between the two cases will be described below). The foot H of a perpendicular extending from the port of injector to a plane containing the position of the maximum diameter D of the recess 3 is 11 mm. The angle $\theta$ contained between the axis of injection of the centrifugal injector 10 and the lower end face of the cylinder head 4 is 60 degrees. Moreover, the angle $\theta_s$ of fuel spray of the centrifugal injector 10 during the fuel injection is about 60 degrees.

For D=38 mm, $\beta$=6 mm and 10 mm, H=11 mm, $\theta$=60° and $\theta_s/2$=30°, therefore, the following relationship is satisfied:

$$H \frac{\tan\left(\frac{\theta_s}{2}\right)}{\sin\theta} \leq \frac{5}{8}D - \beta.$$

In the present invention, using typical values, ⅝D−$\beta$=17.8 for $\beta$=6 mm, and ⅝D−$\beta$=13.8 for $\beta$=10 mm, each of which satisfies the above-specified relationship because H.tan($\theta_s/2$)/sin $\theta$=7.3.

In the aforementioned case of $\beta$=6 mm, by satisfying the above-specified numerical relationships, the atomization phenomena for the recess 3 are as shown in FIG. 7. Fuel droplets P do not wet the wall surface of the recess 3 but can be fed to a predetermined region of the recess 3, and the air layer between said fuel spray and the wall surface of the recess 3 is considerably thick from the open edge to the maximum diameter D of the recess 3. The fuel spray P thus far described can be mixed at an augmented rate with the main flow of the intake swirl within the recess 3. In addition, there is established, by the rise of the piston, the so-called "squish flow", which is directed from the clearance between the cylinder head and the piston top toward the center of the recess, which can partly prevent the fuel droplet from wetting the open edge of side wall of the recess 3 and partly promote the swirling flow of the aforementioned intake swirl.

According to the internal combustion engine exemplifying the second embodiment, therefore, the fuel droplet can be prevented from wetting the side wall of the recess 3, and in addition the fuel can be distributed substantially uniformly over the whole region of the recess, while being carried by the intake swirl, by satisfying the above-specified numerical relationship and by employing either the intake swirl or its interaction with the squish flow. As a result, the internal combustion engine exemplifying the invention can enjoy outstanding practical effects such that the droplets of the atomized fuel are prevented from impinging upon the wall surface of the recess and from becoming coarse, to thereby discharge remarkably little smoke, and such that the fuel is excellently atomized and dispersed by the swirl injector to reduce the emission of hydrocarbons (HC) and to suppress formation of particulates, and at the same time to shorten ignition delay to thereby markedly improve combustion.

In the aforementioned case of $\beta=10$ mm, on the other hand, the atomization phenomena for the recess 3 is as shown in FIG. 8. Fuel droplets $P_1$ do not wet the wall surface of the recess 3, and the air layer between the fuel sprays $P_1$, and the wall surface of the recess 3 is relatively thin from the opening edge to the maximum diameter D of the recess 3. Thus, the case of $\beta=10$ mm can achieve better air utilization than the case of $\beta=6$ mm and so can enjoy excellent operational effects.

Figure 9:
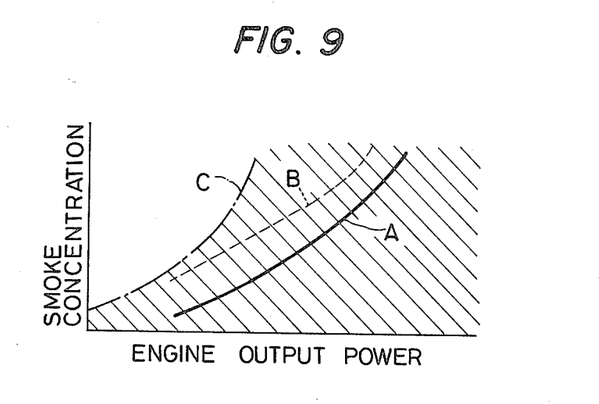
FIG. 9 is a graph illustrating the performance of the second embodiment.

More specifically, as is illustrated in FIG. 9 in which the two cases are depicted by plotting the smoke concentration against the engine output power, the case of $\beta=10$ mm (as depicted by curve A) enjoys better performance such that a higher output power can be generated with less smoking than the case where $\beta=6$ mm (as depicted by curve B). The remaining operational effects are substantially similar to those of the foregoing case where $\beta=6$ mm. If the above-specified numerical relationships are not satisfied, moreover, the fuel spray wets the wall surface of the recess 3 to cause smoke emission and to deteriorate the dispersion of the fuel, to thereby make it impossible to reduce the emission of hydrocarbons, to suppress the formation of particulates and to improve the combustion phenomena with respect to the ignition delay, with a result that the performance is shifted to the region depicted by curve C in FIG. 9, for example.

The third embodiment of the invention satisfies the following relationship:

$$H \frac{\tan\left(\frac{\theta_s}{2}\right)}{\sin \theta} < \frac{D}{8} + \beta$$

By determining the numerical values such that D=38 mm, $\beta=6$ mm and 10 mm, H=11 mm, $\theta=60°$ and $\theta_s/2=30°$, this relation is easily satisfied.

In the present embodiment, more specifically, $\frac{1}{8}D+\beta=14.8$ for $\beta=10$ mm and 10.8 for $\beta=6$ mm, each of which satisfies the above-specified relationship because H tan $(\theta_s/2)/\sin \theta =7.3$.

Figure 10:
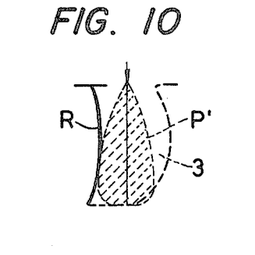
FIGS. 10 and 11 are schematic views showing the respective relationships between the central axis of the recess and the fuel spray in a third embodiment of the invention.

In the aforementioned case where $\beta=6$ mm, by satisfying the above-specified numerical relationships, the atomization phenomena for the central axis R of the recess 3 is as shown in FIG. 10. Fuel sprays P' are not concentrated in the vicinity of the center of the recess 3, but instead a thin air layer exists between the fuel sprays and the central axis R of the recess 3. The fuel droplet can be fed to a predetermined region of the recess 3 and can be mixed at an augmented rate with the main flow of the intake swirl within the recess. As a result, the internal combustion engine exemplifying the present invention can distribute the fuel substantially uniformly within the whole region of the recess by satisfying the above-specified numerical relationships and by interaction with the intake swirl.

As a result, the internal combustion engine exemplifying the present third embodiment is completely freed of any concentration of fuel droplets in the vicinity of the center of the recess 3 and can thereby enjoy a number of practical effects. Partially, the smoke emission may be remarkably reduced because the fuel droplets do not grow coarse; the emission of hydrocarbons (HC) can reduced thanks to the excellent fuel atomization and dispersion of the swirl injector; the emission of particulates can be suppressed and the ignition delay shortened, to thereby remarkably improve the combustion phenomena and the engine performance.

Figure 11:
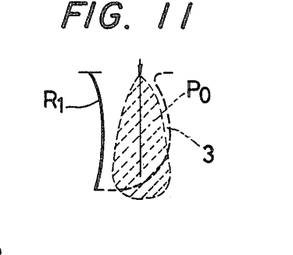

In the foregoing case where $\beta=10$ mm, the atomization phenomena for the central axis $R_1$ of the recess 3 is as shown in FIG. 11. Fuel sprays $P_o$ are not concentrated in the vicinity of the center of the recess 3, and instead a considerably thick air layer exists between the fuel spray $P_o$ and the central axis $R_1$ of the recess 3. This fuel spray $P_o$ can be fed to a predetermined region of the recess 3 and can be mixed at an augmented rate with the main flow of the intake swirl within the recess 3.

Thus, the case where $\beta=10$ mm can enjoy more excellent air utilization than the foregoing case where $\beta=6$ mm, and can attain excellent operational effects.

Figure 12:
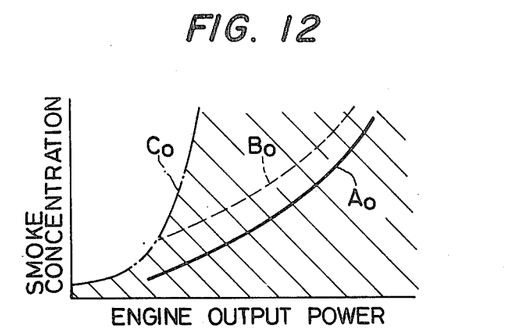
FIG. 12 is a graph illustrating the performance of the third embodiment.

More specifically, as is illustrated in FIG. 12 in which the two cases are depicted by plotting the smoke concentration against the engine output power, the case where $\beta=10$ mm (as depicted by curve $A_o$) enjoys better performance in that a higher output power can be generated with less smoking than the case where $\beta=6$ mm (as depicted by curve $B_o$). The remaining operational effects are substantially similar to those of the foregoing case where $\beta=6$ mm. When the above-specified numerical relationships are not satisfied, moreover, the fuel droplets are concentrated in the vicinity of the center of the recess 3 to cause the emission of smoke and to deteriorate the dispersion of the fuel, with a resultant increase in the emission of hydrocarbons to thereby promote the formation of the particulates and to fail to improve combustion due to the ignition delay thus invited, with a result that performance is shifted to the region depicted by a curve $C_o$ in FIG. 12, for example.

In the modified embodiments of the second or third embodiments, moreover, the above-specified numerical values are typically determined such that D=38 mm, $\beta=8$ mm, H=11 mm, $\theta=60°$, $\theta_2/2=30°$, and $\alpha=13$ mm or such that D=38 mm, $\beta=10$ mm, H=11 mm, $\theta=45°$, $\theta_s=30°$ and $\alpha=15$ mm. In the former modified embodiment, the following relationship is satisfied:

$$Z + \frac{H}{\tan \theta} \leq \frac{3}{4} D + \beta$$

because: $Z = \dfrac{11}{\sin 60° \cdot \cos 60° \left(\frac{\tan 60°}{\tan 30°} - 1\right)}$;

$$Z + \frac{11}{\tan 60°} = 9.5; \text{ and}$$

$$\frac{3}{4} D + \alpha = 41.5.$$

In the latter embodiment, on the other hand, the following relationship is also satisfied:

$$Z + \frac{H}{\tan \theta} \leq \frac{3}{4} D + \alpha$$

because: $Z = \dfrac{11}{\sin 45° \cdot \cos 45° \left(\frac{\tan 45°}{\tan 30°} - 1\right)}$ $$Z + \frac{11}{\tan 45°} = 41; \text{ and}$$

$$\frac{3}{4} D + \alpha = 43.5.$$

Figure 13:
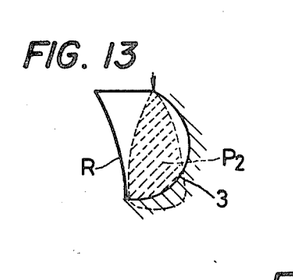
FIGS. 13 and 14 are schematic views showing the respective relationships between the recess and the fuel spray according to other embodiments of the invention.

In the former case ($\beta = 8$ mm and $\alpha = 13$ mm), by satisfying the above-specified numerical relationships, the atomization phenomena for the recess 3 is as shown in FIG. 13. Fuel sprays $P_2$ neither wet the wall surface of the recess 3 nor are concentrated in the vicinity of the center of the recess 3, and the air layer between the fuel sprays $P_2$ and the wall surface of the recess 3 is considerably thick in the vicinity of the maximum diameter D of the recess 3. This fuel droplet can be fed to a predetermined region of the recess 3 and can be mixed at an augmented rate with the flow of the intake swirl within the recess 3. In addition, by the rise of the piston, there can be established the so-called "squish flow" which can partially prevent the fuel droplet from wetting the aforementioned open edge or side wall of the recess 3 and partly promote the swirling flow of the aforementioned intake swirl.

In the internal combustion engine exemplifying the present invention, therefore, the droplet can be prevented from impinging upon the wall surface of the recess 3 by satisfying the above-specified numerical relationships, and the fuel can be distributed substantially uniformly over the whole region of the recess by the action of the intake swirl or by the interaction with the squish flow. As a result, since the internal combustion engine is prevented from having the fuel droplets wet the wall surface of the recess and from having the fuel droplets grow coarse, it is possible to remarkably suppress smoke emission; to reduce the emission of hydrocarbons (HC) and the emission of particulates thanks to the excellent atomization and dispersion of the fuel by the centrifugal injector, and to shorten the ignition delay to thereby improve the combustion phenomena with various resultant practical performance improvements.

Figure 14:
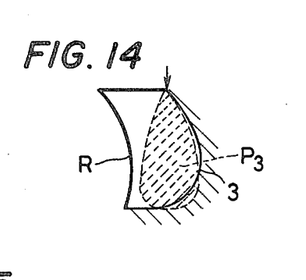

In the latter case ($\beta = 10$ mm and $\alpha + 15$ mm), the atomization phenomena for the recess 3 is as shown in FIG. 14. Fuel spray $P_3$ neither wet the wall surface of the recess 3 nor are concentrated in the vicinity of the center of recess 3, but the air layer between said fuel sprays $P_3$ and the wall surface of the recess 3 is relatively thin in the vicinity of the maximum diameter D of the recess. As a result, this case can enjoy better air use utilization than the former case.

Figure 15:
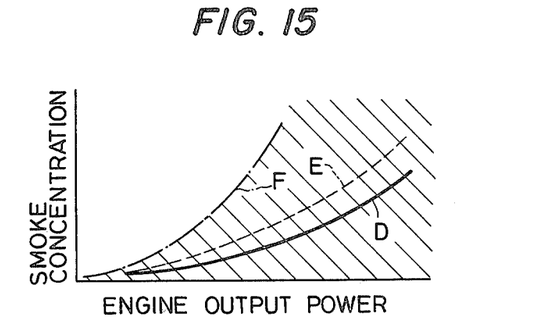
FIG. 15 is a graph illustrating the performance of these other embodiments.

More specifically, as is illustrated in FIG. 15, in which the two cases are depicted by plotting the smoke concentration against the engine output power, the latter case (as depicted by curve D) enjoys more excellent performance such that higher output power can be generated with less smoking than in the former case (as depicted by curve E). The remaining operational effects are common between the two cases. If the above-specified numerical relationships are not satisfied, moreover, the fuel droplets wet the wall surface of the recess 3 to emit smoke and to deteriorate the dispersion of the fuel, to thereby make it impossible to reduce the hydrocarbon (HC) emission level and to suppress the emission of the particulates so that the ignition delay cannot be shortened to improve the combustion phenomena. As a result, the performance is shifted to the region depicted by a curve F in FIG. 15.

According to the internal combustion engine exemplifying the present invention having the construction thus far described, by satisfying the various above-specified numerical ranges, it is possible to prevent the fuel droplet from wetting the opening edge or side wall of the recess 3, to augment the rate at which the fuel droplets are mixed with the main flow of the intake swirl within the recess 3, and to remarkably improve combustion of the internal combustion engine with the resultant effect that the performance can be substantially improved. There can be attained another effect such that the fuel droplets are not concentrated in the vicinity of the center of the recess, while further augmenting the rate at which the fuel droplets are mixed with the main flow of the intake swirl within the recess 3, so that the continuous combustion process can be effected stably and smoothly. In more detail, the fuel droplets are carried by the intake swirl so that they are mixed with the main air flow until they are carried to the peripheral portions of the recess 3. Afterwards, ignition is started from the peripheral portion of the recess 3 so that the burned gases are carried by the intake swirl to the central portion of the recess 3. As a result, the unburned gases are always present at the peripheral portions of the recess 3, thereby eliminating the possibility of causing deterioration of the ensuring combustion process.

By considering the interferences between the arrival range of the fuel droplets with respect to the direction of injection and the wall surface of the recess 3, still moreover, the dispersion of the fuel droplet within the recess 3 is remarkably improved together with engine performance.

Incidentally, the fuel injection pressure is at 150 to 200 kg/cm² in accordance with this invention, which is considerably low for a direct injection type internal combustion engine.

In the Diesel engines according to the present invention, the fuel is injected under this low injection pressure from the centrifugal injector 10 into the main flow of the relatively weak intake swirl within the recess, so that the fuel droplets are excellently dispersed and so that remarkably little fuel wets the opening edge or the side wall of the recess.

What is claimed is:

1. A direct injection type internal combustion engine comprising:
a combustion chamber defined by a piston, a cylinder head and a cylinder block; said piston including a recess, comprising said combustion chamber, in which intake air is introduced and swirled; and
a fuel injector comprising:
a swirl injector for atomizing fuel in a generally conical form while swirling the same, said swirl injector having a port of injection and being arranged such that its axis of sprays fails to intersect the central axis of said recess but extends at an inclination with respect to the same;
said swirl injector being provided so as to satisfy the following relationship $$H \frac{\tan\left(\frac{\theta_s}{2}\right)}{\sin \theta} \leq \frac{2}{3} D - \beta$$

wherein
D designates the maximum distance between facing sides of said recess;

β designates the distance betweenn the axis of sprays of said swirl injector and a second plane intersecting, at a right angle, a first transverse plane containing the location of the maximum distance D of said recess, said second plane being parallel to the axis of sprays of said swirl injector and containing the center of said recess on said first transverse plane;

H designates the length of a perpendicular extending from said port of injection to a plane containing the location of the maximum distance D of said recess;

$\theta$ designated the angle contained between the axis of sprays of said swirl injector and the first trasverse plane; and $\theta_s$ designates the angle of sprays of said swirl injector during fuel injection, thereby injecting the atomizing fuel from said swril injector to the predetermined portion in said recess in which the intake air is swirled and ensuring a high burning rate.

2. A direct injection type internal combustion engine according to claim 1, wherein the following relationships are satisfied;

$$\theta > \frac{\theta_s}{2} \text{ ; and } Z + \frac{H}{\tan \theta} \leqq \frac{3}{4} D + \alpha,$$

$$Z = \frac{H}{\sin \theta \cdot \cos \theta \left( \frac{\tan \theta}{\tan \left( \frac{\theta_s}{2} \right)} - 1 \right)}$$

in which: α designates the distance between the port of injection of said swirl injector during fuel injection and the plane intersecting the second plane at a right angle and containing the center of the recess on the first transverse plane.

3. A direct injection type internal combustion engine comprising:

a combustion chamber defined by a piston, a cylinder head and a cylinder block; said piston including a recess, comprising said combustion chamber, in which intake air is introduced and swirled; and a fuel injector comprising:

a swirl injector for atomizing the fuel in a generally conical form while swirling the same, said swirl injector having a port of injection and being arranged such that its axis of sprays fails to intersect the central axis of said recess but extends at an inclination with respect to the same;

said swirl injector being provided so as to satisfy the following relationship $$H \frac{\tan \left( \frac{\theta_s}{2} \right)}{\sin \theta} < \frac{D}{8} + \beta$$

wherein
D designates the maximum distance between facing sides of said recess;

β designates the distance between the axis of sprays of said swirl injector and a second plane intersecting, at a right angle, a first transverse plane containing the location of the maximum distance D of said recess, said second plane being parallel to the axis of sprays of said swirl injector and containing the center of said recess on said first transverse plane;

H designates the length of a perpendicular extending from said port of injection to a plane containing the location of the maximum distance D of said recess;

$\theta$ designates the angle contained between the axis of sprays of said swirl injector and the first transverse plane; and $\theta_s$ designates the angle of sprays of said swirl injector during fuel injection, thereby injecting the atomizing fuel from said swirl injector to the predetermined portion in said recess in which the intake air is swirled and ensuring a high burning rate.

4. A direct injection type internal combustion engine according to claim 3, wherein the following relationships are satisfied:

$$\theta > \frac{\theta_s}{2} \text{ ; and } Z + \frac{H}{\tan \theta} \leqq \frac{3}{4} D + \alpha,$$

$$Z = \frac{H}{\sin \theta \cdot \cos \theta \left( \frac{\tan \theta}{\tan \left( \frac{\theta_s}{2} \right)} - 1 \right)}$$

in which: α designates the distance between the port of injection of said swirl injector during fuel injection and the plane intersecting the second plane at a right angle and containing the center of the recess on the first transverse plane.

* * * * *

UNITED STATES PATENT AND TRADEMARK OFFICE
CERTIFICATE OF CORRECTION

PATENT NO. : 4,473,046
DATED : September 25, 1984
INVENTOR(S) : Taro AOYAMA et al It is certified that error appears in the above-identified patent and that said Letters Patent is hereby corrected as shown below:

Column 2, line 67, change "that" to --air--.

Column 3, line 25, change "nossle" to --nozzle--.

Column 7, line 41, change "designated" to --designates--;

line 58, after "mixed" insert --by--.

Signed and Sealed this

Twenty-sixth Day of February 1985

[SEAL]

Attest:

DONALD J. QUIGG

Attesting Officer            Acting Commissioner of Patents and Trademarks